United States Patent [19]

Arai et al.

[11] Patent Number: 5,264,160
[45] Date of Patent: Nov. 23, 1993

[54] METHOD OF MOLDING OPTICAL ELEMENTS

[75] Inventors: Takashi Arai, Tokyo; Yukihisa Baba, Yokohama; Sachio Umetsu, Kawasaki, all of Japan

[73] Assignee: Canon Kabushiki Kaisha, Tokyo, Japan

[21] Appl. No.: 874,087

[22] Filed: Apr. 27, 1992

[30] Foreign Application Priority Data

Apr. 30, 1991 [JP] Japan ................... 3-099183
Jul. 8, 1991 [JP] Japan ................... 3-166652
Apr. 20, 1992 [JP] Japan ................... 4-099332

[51] Int. Cl.$^5$ .................. B29C 35/08; B29D 11/00
[52] U.S. Cl. ............................ 264/1.4; 222/1; 264/1.7
[58] Field of Search ............. 264/1.4, 1.7; 29/527.1, 29/527.2, 527.4; 222/1

[56] References Cited

U.S. PATENT DOCUMENTS

| | | | |
|---|---|---|---|
| 4,432,832 | 2/1984 | Fantone | 264/1.7 X |
| 4,756,972 | 7/1988 | Kloosterboer et al. | 264/1.7 X |
| 5,102,599 | 4/1992 | Shults | 264/142 |

FOREIGN PATENT DOCUMENTS 62-227711 10/1987 Japan ................... 264/1.7

Primary Examiner—Leo B. Tentoni
Attorney, Agent, or Firm—Fitzpatrick, Cella, Harper & Scinto

[57] ABSTRACT

A method of molding an optical element in which a required amount of a resin material can be accurately supplied without air bubbles becoming entrapped in the resin material when it is supplied. The method includes a first step of making a tip of resin material supply means approach a molding surface until the tip is a predetermined distance away from the molding surface, a second step of discharging a predetermined amount of the resin material from the tip of the supply means while the tip of the supply means is the predetermined distance away from the molding surface, and a third step of discharging the resin material from the tip at a predetermined discharge rate, until a required amount of the resin has been supplied, while the tip of the supply means is moved in a direction away from the molding surface as the lower end of the resin material discharged from the tip is maintained in contact with the molding surface.

14 Claims, 9 Drawing Sheets

EFFECTIVE DIAMETER D
OF LIGHT RAYS

EFFECTIVE
DIAMETER D
OF LIGHT RAYS

METHOD OF MOLDING OPTICAL ELEMENTS

BACKGROUND OF THE INVENTION

This invention relates to a method of molding an optical element in which a resin layer is integrally molded on the surface of a glass member.

In the prior art, a method is known in which a thin film comprising a resin material is molded on the surface of a glass member to form a lens having an aspherical shape, which is difficult to work when the material is glass. The lens molded by this method generally is referred to as a replica lens.

As shown in FIG. 1, the method of molding a replica lens in the prior art includes placing a glass member 50, which has been worked into a spherical shape having a curvature approximating a desired aspherical shape, upon a molding member 52 having a molding surface 52a of the desired aspherical shape, filling a space 54 between a surface 50a of the glass member 50 and the molding surface 52a of the mold member 52 with a liquified resin and causing the resin to harden, thereby forming a replica lens 55 having the desired aspherical shape.

In a molding method of this kind, it is required that the molding surface 52a of the mold member 52 be supplied with the resin material in advance before the glass member 50 is placed upon the mold member 52. As one method of supplying the resin material, the resin material is dropped upon the molding surface 52a from a tip 60a of an apparatus for supplying the resin material, as shown in FIG. 2, with the tip 60 being kept spaced away from the molding surface. In an alternative method, as depicted in FIG. 3, the tip 60a of the supply apparatus 60 is brought in close proximity to the molding surface 52a, under which condition the resin material is supplied to the molding surface.

However, both of these supply methods involve problems. Specifically, with the method in which the resin material is dropped onto the molding surface 52a while the tip 60a of the supply apparatus 60 is kept spaced away from the molding surface, as shown in FIG. 2, air bubbles become entrapped in the resin material owing to the shock sustained when the resin material drops. With the method in which the resin material is supplied while the tip 60 of the supply apparatus 60 is held close to the molding surface 52a, as shown in FIG. 3, the resin material attaches itself to the tip of the supply apparatus, as a result of which an accurate amount of the resin material cannot be supplied.

Further, in the process of placing the glass member 30 upon the support member 52 after the resin material has been supplied to the molding surface 52a, there is the danger that air bubbles will become entrapped in the resin material. If the resin hardens while containing such air bubbles, the entrapped air bubbles that can be confirmed visually render the manufactured product unsuitable for shipping even if the air bubbles are entrapped to a degree that will not affect the optical function of the lens. As a consequence, a problem which arises is a decline in the yield of the replica lens manufactured.

SUMMARY OF THE INVENTION

An object of the present invention is to provide a method of molding an optical element, wherein the method is so adapted that air bubbles will not be entrapped in the resin material when the resin material is supplied.

Another object of the present invention is to provide a method of molding an optical element, in which the resin material is capable of being supplied accurately in the amount required.

A further object of the present invention is to provide a method of molding an optical element, in which the yield of the optical element can be improved by reliably preventing air bubbles from becoming entrapped in the resin material when the glass member is placed upon the mold member.

According to a first aspect of the present invention, the foregoing objects are attained by providing an optical-element molding method for forming an optical element in which a glass material and a resin material are integrated by forming a resin layer, which has a predetermined surface shape, on a surface of a glass member by molding work, comprising a first step of making a tip of resin material supply means approach a molding surface, which is for transferring the predetermined surface shape to a surface of the resin layer, until the tip is a predetermined distance away from the molding surface, a second step of discharging a predetermined amount of the resin material from the tip of the supply means while the tip of the supply means is the predetermined distance away from the molding surface, and a third step of discharging the resin material from the tip at a predetermined discharge rate, until a total amount of resin which includes the predetermined amount and an amount of resin material discharged in this step attains an amount of resin necessary to be supplied, while the tip of the supply means is moved in a direction away from the molding surface as a lower end of the resin material discharged from the tip is maintained in contact with the molding surface.

According to a second aspect of the present invention, the foregoing objects are attained by providing an optical-element molding method for forming an optical element in which a glass material and a resin material are integrated by forming a resin layer, which has a predetermined surface shape, on a surface of a glass member by molding work, comprising a first step of supplying the resin material to a molding surface that is for transferring the predetermined surface shape to a surface of the resin layer, a second step of moving the glass member at a high speed from a first position at which the surface of the glass member is spaced a predetermined distance away from the molding surface to a second position at which the surface of the glass member is about to touch the resin material that has been supplied to the molding surface, a third step of moving the glass member at a first low speed from the second position to a third position at which the surface of the glass member touches an upper end of the resin material, and a fourth step of moving the glass member at a second low speed from the third position to a fourth position at which the glass member touches a support portion for supporting the surface of the glass member in a state in which the surface of the glass member is spaced away from the molding surface by a distance which determines the thickness of the resin layer.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiment of the invention, and therefore reference is made to the claims which follow the description for determining the scope of the invention.

DESCRIPTION OF THE PREFERRED EMBODIMENT

A preferred embodiment of the present invention will now be described in detail with reference to the accompanying drawings.

Figure 1:
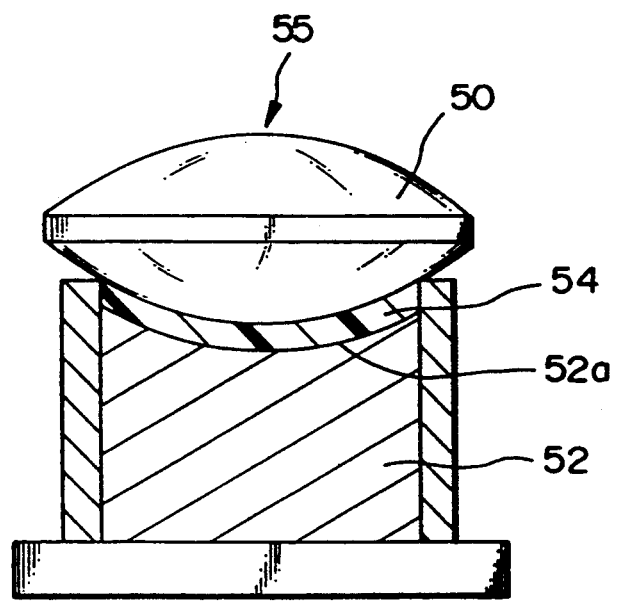
FIG. 1 is a diagram illustrating an example of the prior art.
Figure 2A:
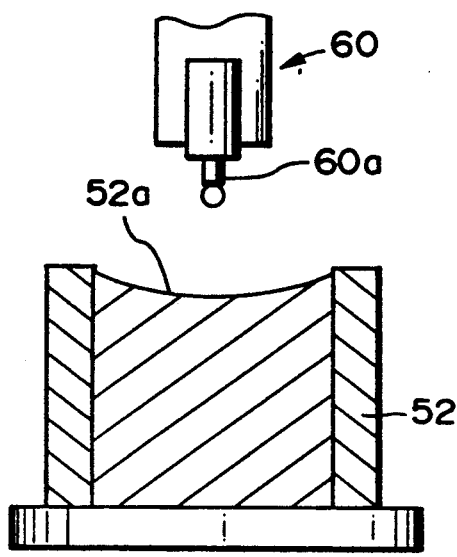
FIGS. 2(a) and 2(b) are diagrams illustrating an example of a method of supplying a resin material according to the prior art.
Figure 2B:
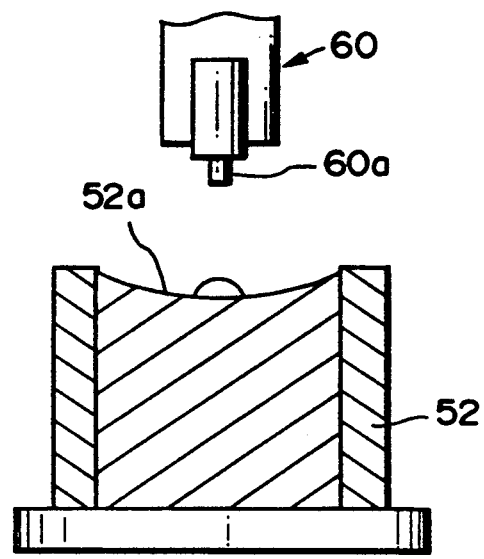
Figure 3A:
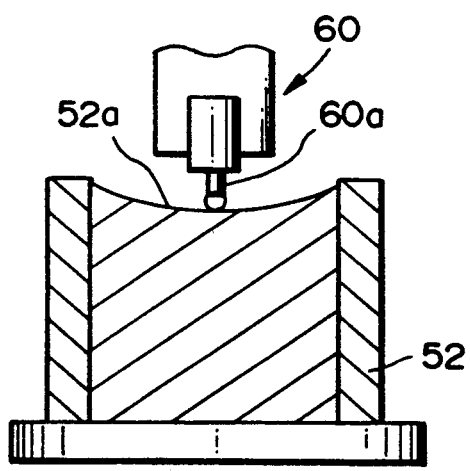
FIGS. 3(a) and 3(b) are diagrams illustrating another example of a method of supplying a resin material according to the prior art.
Figure 3B:
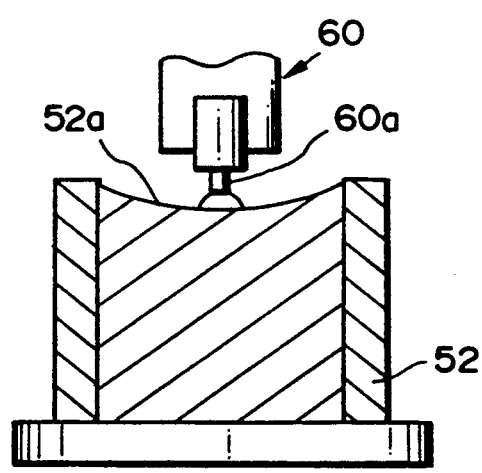
Figure 4:
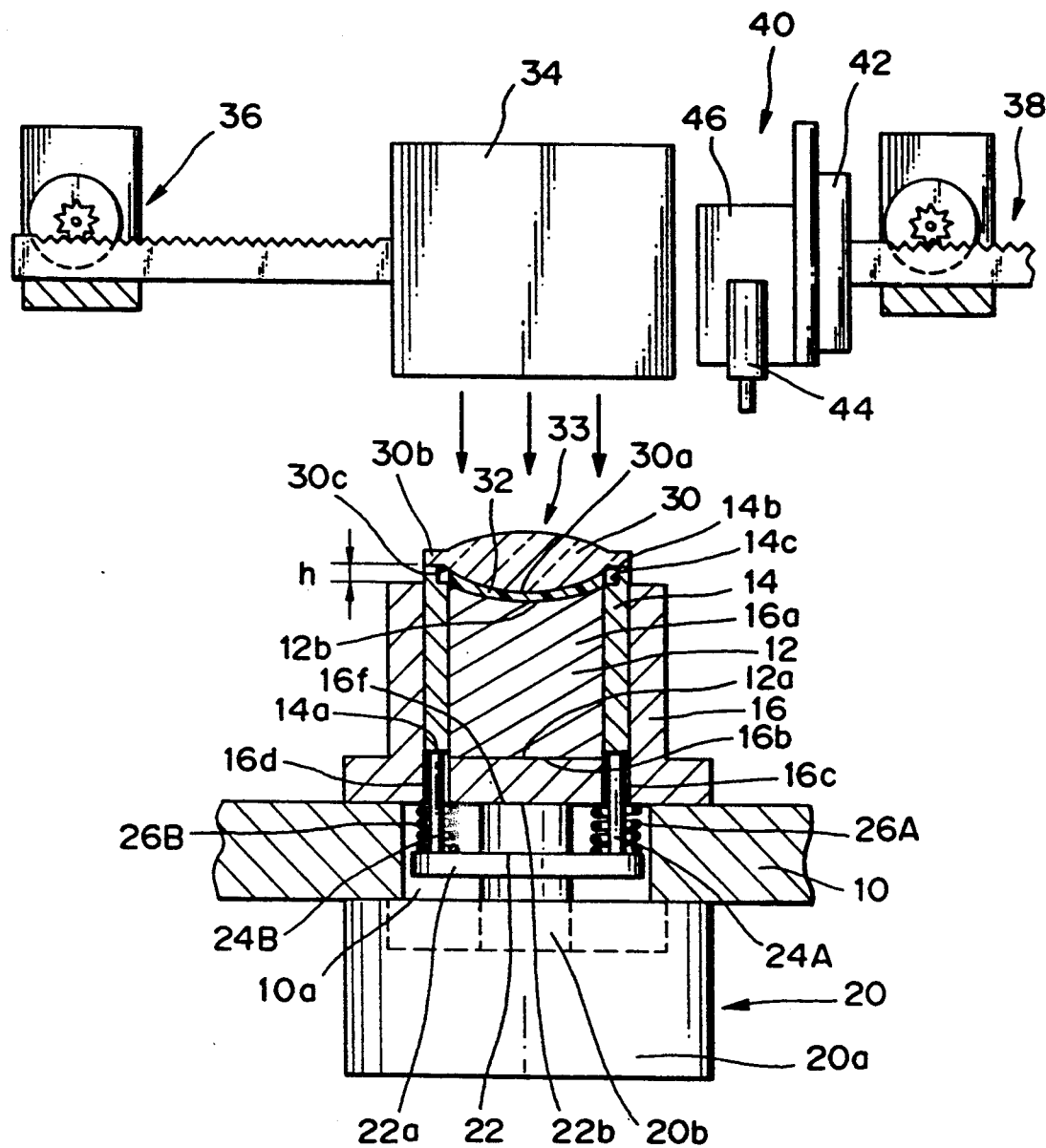
FIG. 4 is a diagram showing the construction of a molding apparatus applying a method of molding an optical element according to an embodiment of the present invention.

FIG. 4 is a diagram showing the general structure of a molding apparatus used when molding an aspherical lens by a method of molding an optical element according to an embodiment of the present invention.

Before the construction of the molding apparatus is discussed, the particulars of a method of molding the optical element of the embodiment will be described. The method of molding the optical element of this embodiment involves forming a shape, of a kind which is difficult to work in the case of a glass material, on the surface of a glass material, and forming a resin layer having a surface of a prescribed complicated shape and consisting of a resin material on the surface of a glass member worked into a shape that is comparatively easy to work. An example is fabrication of an aspherical lens in which a film of resin having an aspherical shape is molded on the surface of a glass member worked into a spherical shape to combine the glass material and the resin material. In other words, in order to provide a lens in which aberration is corrected by a single lens, it is necessary that the surface shape of the lens be made aspherical. However, it is not easy to work a glass material into an aspherical shape, and it is difficult to realize lens power with a lens which uses a resin that is readily molded into an aspherical shape. Accordingly, it has been attempted to exploit the advantages of both types of lenses by combining them. A lens thus manufactured in referred to as a replica lens.

More specifically, as shown in FIG. 4, a resin layer 32 comprising a thin resin film of a type cured by an activating energy beam is formed on one surface, namely a contact surface 30a, of a glass member 30 whose surface has been worked to a spherical shape. The glass member 30 has a flange-shaped rim portion 30b on its outer circumference and is retained on a support member 14 with the rim portion 30b in abutting contact with an upper end face 14b of the support member 14. The upper end face 14b of the support member 14 protrudes by a height h from the edge portion of a molding surface 12b of a mold member 12 that is for molding the surface shape of the resin material. By virtue of the amount of protrusion h, a prescribed thickness is provided even at the portion where the resin layer 32 is least thick. (Since the molding surface 12b is aspherical in shape, the thickness of the resin layer differs depending upon the location.) The space defined by the molding surface 12b of the mold member 12 and the contact surface 30a is filled with a liquified resin material. By irradiating this resin material with an activating energy beam, the resin material is cured to complete a replica lens 33.

The construction of the apparatus for molding and working the replica lens will now be described in accordance with FIG. 4. Numeral 10 denotes a base plate which holds the mold member 12 for molding the resin layer 32, as well as the support member 14 for supporting glass member 30. The base plate 10 is provided so as to extend horizontally. The mold member 12, the support member 14 and a molding frame 16 are supported on the top side of the base plate 10. An air cylinder 20 for moving the support member 14 relative to the mold member 12 is disposed beneath the base plate 10.

More specifically, the frame 16, the central portion of which has a columnar cavity 16a opening vertically upward, is fixed to the top side of the base plate 10. A cylindrically shaped support member 14 having an outer diameter slightly less than the inner diameter of the columnar cavity 16a is inserted into the cavity 16a. That is, the support member 14 is inserted into the frame 16 so as to be capable of sliding axially (up and down in FIG. 4) with its outer peripheral surface fitted into the inner peripheral surface of the cavity 16a. Since the lower end face 14a of the support member 14 comes into abutting contact with the bottom 16b of the cavity 16a, the support member 14 is prevented from moving downward beyond bottom 16b.

The columnar mold member 12, whose outer diameter is slightly smaller than the inner diameter of the support member 14, is inserted into the support member 14. The support member 14 and the mold member 12 are capable of sliding relative to each other in a state in which they are fitted together so that the outer peripheral surface of the mold member 12 and the inner circumferential surface of the support member 14 are slidable. The mold member 12 has a bottom surface 12a fixed to the bottom 16b of the cavity 16. As a result, the support member 14 is capable of sliding up and down with its inner and outer peripheral surfaces being guided by the outer peripheral surface of the mold member 12 and the inner peripheral surface of the frame 16, respectively.

The air cylinder 20, which is for moving the support member 14 up and down relative to the mold member 12 and frame 16, is secured to the bottom side of the base plate 10. The upper end of the air cylinder 20 has a cylinder rod 20b which moves relative to an air cylinder body 20a. A columnar connecting member 22 for being connected to the support member 14 is attached to the top side of the cylinder rod 20b. The cylinder rod 20b and the connecting member 22 are interconnected by a mechanical member, which is disposed on the upper side of the base plate 10, via a through-hole 10a formed in the base plate 10.

The circumferential portion of the connecting member 22 is formed to have a flange 22a. Connecting rods 24A, 24B and 24C (only 24C is not shown) are secured in an upright state to the top side of the flange 22a at three locations on the circumference thereof. The upper ends of the connecting rods 24A, 24B and 24C, which are passed through through-holes 16c, 16d and 16e (only 16e is not shown) formed at three locations in the bottom of the frame 16, penetrate into the columnar cavity 16a and are connected to the end face 14a on the lower side of the support member 14. Accordingly, when the air cylinder 20 is actuated to move the connecting member 22 upward, the support member 14 is urged upward via the connecting rods 24A, 24B and 24C.

FIG. 4 illustrates the support member 14 urged to its uppermost position. In this state, the upper end face 14b of the support member 14 protrudes by the amount h beyond the edge of the resin-material molding surface 12b, which is the upper surface of the mold member 12. The molding surface 12b of the mold member 12 has been worked to an aspherical shape required for the completed shape of the replica lens 33. Therefore, by curing a resin material, which fills the space defined by the contact surface 30a of the glass member 30 and the molding surface 12b in a state in which the glass member 30 has been placed upon the top side 14b of the support member 14, the resin layer 32 to which the aspherical shape of the molding surface 12b has been transferred can be formed on the surface of the glass member 30.

It will be understood from observing FIG. 4 that the amount of protrusion h of the support member 14 decides the thickness of the resin layer 32 formed on the glass member 30. In order to accurately decide the amount of protrusion h, the upper surface of the connecting member 22 is formed to have an abutting face 22b. By bringing the abutting face 22b into contact with a bottom side 16f of the frame 16, the amount of protrusion h of the support member 14 is determined. Though the value of h differs depending upon the degree to which the molding surface 12b is aspherical, h is set to such a value that the thickness of the resin layer 32 will not fall below, say, 30 μm, at the location where the resin layer 32 is thinnest.

The upper end of the support member 14 is formed to have a relief 14c for accommodating a bulging portion of the resin material caused by overflow. This prevents overflowing resin material from attaching itself to the support member 14. It also prevents burrs from being formed by overflow of the resin material from the portion where the glass member 30 and the upper end face 14b of the support member 14 contact each other.

Compression springs 26A, 26B, 26C (only 26C is not shown) are disposed in a loosely fitted state on the connecting rods 24A, 24B, 24C, respectively, between the bottom side 16f of the frame 16 and the top side of the flange 22a of connecting member 22. As a result, the connecting member 22 is urged downwardly away from the bottom side 16f of the frame 16. Accordingly, when the air cylinder 20 is deactuated, the cylinder rod 20b and the connecting member 22 are urged downwardly under their own weight and by the biasing force of the compression springs 26A, 26B, 26C, and the support member 14 moves downward relative to the mold member 12 and frame 16. Consequently, the upper end face 14b of the support member 14 is lowered until it becomes flush with the molding surface 12b of the mold member 12; hence, the glass member 30 is no longer supported by the support member 14.

An irradiating apparatus 34 for emitting activating energy beams is arranged above the glass member 30. The resin layer 32 can be cured by irradiating it with the activating energy beams from the irradiating apparatus 34. The latter is supported on a transport mechanism 36 and is so adapted that it can be withdrawn from the optic axis of the glass member 30 when necessary.

In addition to the irradiating apparatus 34, an apparatus 40 for supplying the resin material is arranged above the glass member 30. The supply apparatus 40 is supported on a transport mechanism 38 capable of being moved between a position on the optic axis of the glass member 30 and a position remote therefrom. The supply apparatus 40 is equipped with an elevating mechanism 42 held by the transport mechanism 38, a syringe 44 supported on the elevating mechanism 42, and a drive unit 46 for driving a piston possessed by the syringe 44. The supply apparatus 40 is so adapted as to supply the molding surface 12b of the mold member 12 with a predetermined amount of resin material.

Though not shown in its entirety, a supply robot 47 (see FIG. 6) having a suction-type hand 47a for supplying the glass member 30 to the mold member 12 is arranged at a predetermined position with respect to the mold member 12.

A procedure for molding and working the replica lens in the molding apparatus set forth above will now be described.

In connection with the molding of the replica lens 33, it is necessary first to supply the molding surface 12b of the mold member 12 with the resin material. FIG. 5 illustrates the procedure of the operation for supplying the resin material.

Figure 5A:
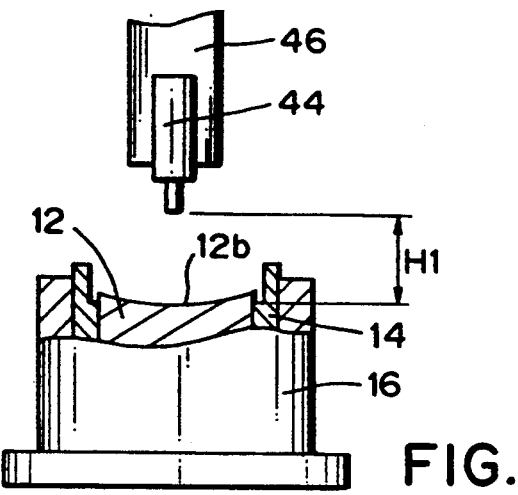
FIGS. 5(a)–5(e) are diagrams showing the procedure of an operation for supplying a resin material.
Figures 5B, 5C:
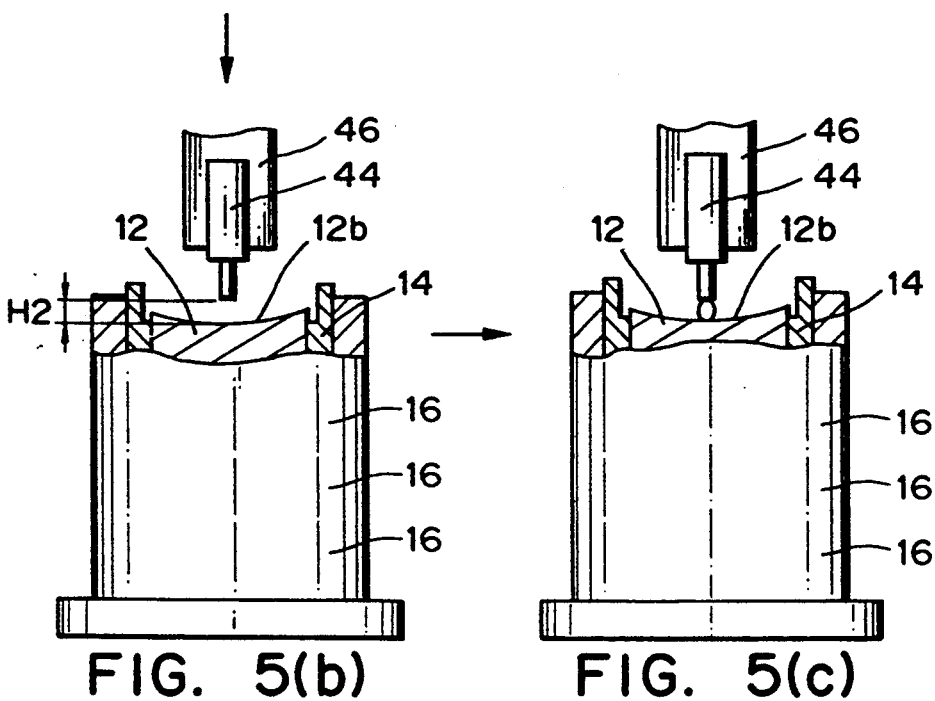
Figures 5D, 5E:
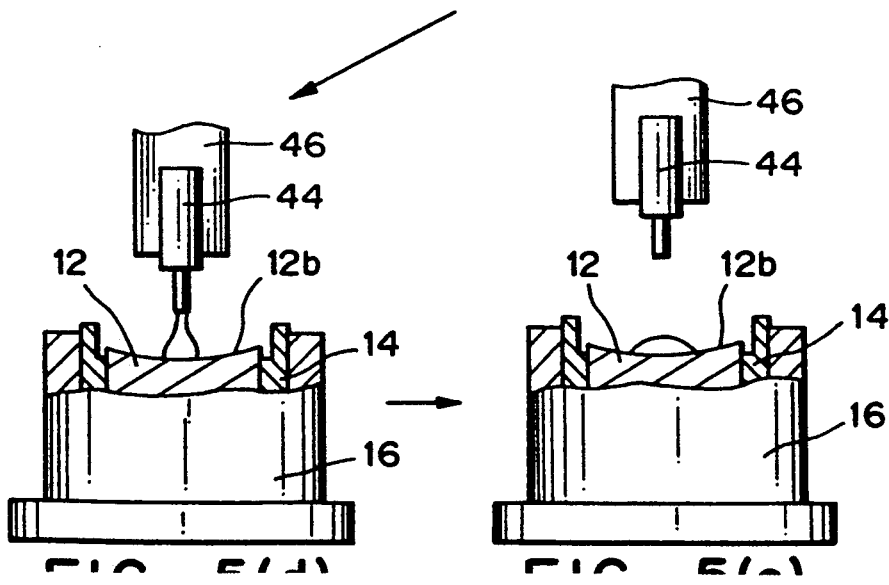

First, the transport mechanism 38 is actuated to position the supply apparatus 40 relative to the mold member 12 in such a manner that the tip of the syringe 44 is brought to the center of the molding surface 12b, as illustrated in FIG. 5(a). Next, the elevating mechanism 42 is actuated and lowered in such a manner that the syringe 44 is made to approach the molding surface 12b, as shown in FIG. 5(b). The elevating mechanism 42 is halted just before the tip of the syringe 44 contacts the molding surface 12b. Under these conditions, a resin material is discharged in small increments from the tip of the syringe 44, as depicted in FIG. 5(c). At the same time as discharge begins, or upon passage of a prescribed period of time from the start of discharge, the syringe 44 is slowly raised, as shown in FIG. 5(d). The operation for discharging the resin material continues even as the syringe 44 is being raised and is terminated when the amount of resin material supplied reaches a prescribed value. The rate at which the resin material is discharged and the speed at which the syringe 44 is raised are set in such a manner that there will be no interruption in the resin material between the molding surface 12b and the tip of the syringe 44 when the syringe 44 is being raised. When the syringe 44 has reached a predetermined height, the operation of the elevating mechanism 42 is terminated.

A specific example of the operation for supplying the resin material will be described. It will be assumed that the resin material used is of the type cured by ultraviolet radiation, namely a monomer of urethanated acrylate and acrylate, and that an aspherically shaped resin layer having a center thickness of 30 μm and a maximum thickness of 60 μm is molded on the surface of a glass lens having a diameter of 18 mm. In this case the volume of the resin material supplied will be $14 \times 10^{-3}$ cc.

First, in FIG. 5(a), the height, indicated by H1, of the tip of syringe 44 above the molding surface 12b is 100 mm. From this position, the syringe 44 is lowered at a speed V1=100 mm/sec and is stopped when its tip reaches a position having a height H2=1.1 mm from the molding surface 12b, as illustrated in FIG. 5(b).

Next, in the state shown in FIG. 5(b), the resin material starts being discharged from the syringe 44 at a rate of $3.5 \times 10^{-3}$ cc/sec. When $3.5 \times 10^{-3}$ cc of the resin material has been discharged and the resin material contacts the molding surface 12b, as depicted in FIG. 5(c), the syringe 44 starts to be raised at a low speed, i.e., 0.2 mm/sec. As the syringe 44 is thus being raised, the resin material continues to be discharged, as illustrated in FIG. 5(d). Then, 4 sec after the start of resin discharge, the discharging operation is terminated. A suitable amount of the resin material, namely $14 \times 10^{-3}$ cc, is thus discharged. At this time the tip of the syringe 44 is at a height of 1.7 mm from the molding surface 12b, but the syringe 44 continues to be raised without intereruption. When the tip of the syringe 44 reaches a position at a height of 6 mm from the molding surface 12b, the elevation operation is halted. Thereafter, as depicted in FIG. 5(e), the syringe 44 is raised at a high speed to return it to the same position as that shown in FIG. 5(a). Here the process for supplying the resin material is ended.

By supplying the resin material in accordance with the foregoing process, the following two effects are obtained:

(1) The resin material is not dropped onto the molding surface 12b from a position high above it. Rather, the resin material is allowed to contact the molding surface gently while in a generally spherical shape resulting from its surface tension. This makes it possible to prevent air bubbles from forming in the resin material owing to shock sustained by being dropped upon the molding surface.

(2) In a case where the resin material is discharged at a position close to the molding surface 12b, the surface tension of the resin material causes a ball of the resin material to form so as to envelope the tip of the syringe 44. As a consequence, the resin material attaches itself to the tip of the syringe 44 so that an accurate amount of the resin material cannot be supplied. By contrast, when the tip of the syringe 44 is raised as the resin material is being discharged, as in the above-described embodiment, the resin material no longer is capable of attaching itself to the syringe tip. This makes it possible to accurately regulate the amount of resin material supplied.

In connection with (1) above, the entrapment of air bubbles in the resin material is conceivable also in the process of placing the glass member 30 on the support member 14 after the resin material has been supplied. Accordingly, it is very important that these processes be managed so as to prevent the entrapment of air bubbles. Even if air bubbles are entrapped to a degree that will not affect the optical function of the lens, entrapped air bubbles that can be confirmed visually render the manufactured product unsuitable for shipping. Thus, managing this problem is an important factor in raising yield.

In connection with (2) above, the amount of resin material which fills the space between the contact surface 30a of the glass member 30 and the molding surface 12b is very small and therefore it is important that the amount of resin material be precisely regulated so that a fixed quantity is supplied. By adopting the method set forth above, the volume of the resin material supplied can be accurately controlled so as to be constant.

In a case where, by way of example, an arrangement is adopted for controlling the weight of the resin material at the time of supply, the volume of the resin material varies widely depending upon temperature and humidity, even if the weight of the resin material is constant. This makes it necessary to strictly manage temperature and humidity in order that the resin material will be delivered even to the corners of the space between the contact surface 30a and the molding surface 12b and without protruding from the space by a large amount. To this end, it is preferred that the amount of resin material supplied be controlled based upon volume.

When supply of the resin material ends, the moving mechanism 38 is actuated to retract the supply apparatus 40 from the optic axis of the glass member 30. As shown in FIG. 4, the air cylinder 20 is actuated to elevate the support member 14 to place the upper end face 14b of the support member 14 in a state where it protrudes from the edge of the molding surface 12b of the mold member 12 by the amount h. When this state has been attained, the glass member 30, whose contact surface 30a has been coated with a coupling agent so that the resin layer 32 will not readily peel off, is placed upon the support member 14 in such a manner that its rim portion 30b abuts against the upper end face 14b of the support member.

The glass member 30 is placed upon the support member 14 very carefully so that the resin material will be delivered, without air bubbles being formed, into the space, including the corners thereof, defined by the contact surface 30a of the glass member 30 and the molding surface 12b of the mold member 12.

In the process for placing the glass member 30 upon support member 14, care must be taken to assure that air bubbles do not become entrapped in the resin material. FIG. 6 is a diagram illustrating the procedure for placing the glass member 30 in such a manner that air bubbles will not become entrapped in the resin material.

First, with the glass member 30 secured to the suction hand 47a by means of suction, the glass member 30 is positioned above the mold member 12 by the supply robot 47 in such a manner that the optic axis of the glass member 30 is aligned with the central axis of the mold member 12. This is the state illustrated in FIG. 6(a). Under these conditions, the supply robot 47 is actuated to lower the glass member 30 at high speed toward the molding surface 12b and is stopped just before the central portion of the contact surface 30a of the glass member 30 touches the resin material that has already been supplied to the molding surface 12b, as depicted in FIG. 6(b).

Next, the supply robot 47 is actuated again to lower the glass member 30 at a first low speed until the central portion of the contact surface 30a of the glass member 30 touches the resin material on the molding surface 12b. The supply robot 47 is stopped again when this contact has been made. FIG. 6(c) shows the state which prevails when the central portion of the contact surface 30a has touched the resin material. The glass member 30 is held at this position for a prescribed period of time. By thus holding the glass member 30 in contact with the resin material, the area of contact between the resin material and the contact surface 30a gradually widens.

When the area of contact between the resin material and the contact surface 30a has become sufficiently large, the supply robot 47 is actuated again to lower the glass member 30 at a second low speed, which is slightly greater than the first low speed. The supply robot 47 is stopped when the rim portion 30b of the glass member 30 has contacted the upper end face 14b of the support member 14.

A specific example of the operation for placing the glass member 30 on the support member 14 will now be described. In the example, it will be assumed that an ultraviolet radiation-curable resin (the viscosity of which is approximately 2500 cps) in which the monomer component is urethanated acrylate and acrylate is used as the resin material under the same conditions as those set forth in the description of the operation for supplying the above-mentioned resin material, and that a resin layer having an aspherical shape, the center and maximum thicknesses of which are 30 $\mu$m and 60 $\mu$m, respectively, is formed on the surface of a glass lens having a diameter of 18 mm.

Figure 6A:
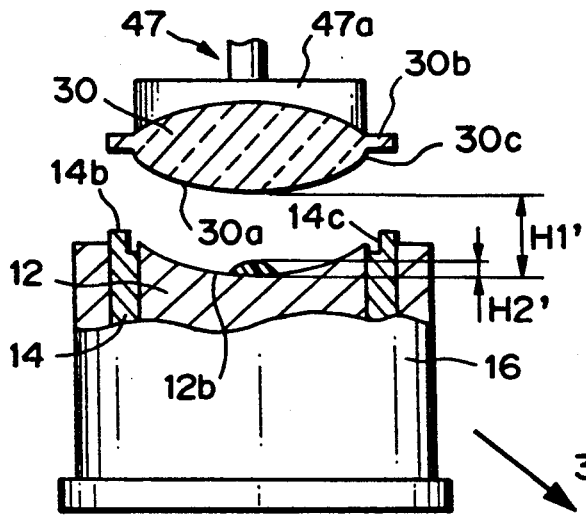
FIGS. 6(a)–6(e) are diagrams showing the procedure of an operation for placing a glass member on a support member.
Figure 6B:
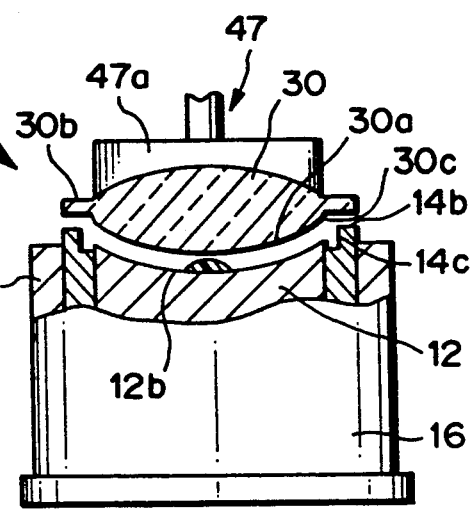
Figure 6C:
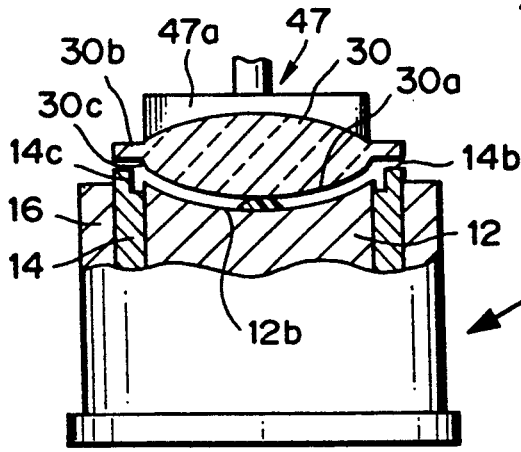

First, in FIG. 6(a), $14 \times 10^{-3}$ cc of the resin material is supplied to the molding surface 12b of mold member 12. Here the height H1' of the glass member 30 from the molding surface 12b is about 100 mm, and the glass member 30 is lowered from this position at a speed V3=10 mm/sec. The glass member 30 is stopped just before the central portion of the contact surface 30a touches the resin material. As for the time T from the moment the glass member 30 starts descending to the moment the glass member 30 contacts the resin material, the relation T=(H1'−H2')/V3 approximately holds if the height of a resin droplet on the molding surface 12b is H2'. The height H2' of the resin droplet is decided by such properties as the surface tension of the resin material and the wettability of the molding surface 12b. The value of H2' is verified in advance by computation based upon these physical properties, or by experimentation. Accordingly, since the time T required for the glass member 30 to contact the resin material can be calculated, the descent of the glass member 30 is stopped immediately before the time that has elapsed from the start of the descent of the glass member 30 reaches T.

Next, from the attitude shown in FIG. 6(b), the glass member 30 is lowered at the first speed, namely V4=0.1 mm/sec, and is stopped when the central portion of the contact surface 30a contacts the resin material. The timing at which the glass member 30 is stopped also is determined by measuring time from the moment the glass member starts being lowered. When the glass member 30 is at the position where its contact surface 30a is in contact with the resin material, the glass member 30 is held at this position for about 1 sec. During this one second of time, the area of contact between the resin material and the contact surface 30a gradually broadens from the state shown in FIG. 6(c) to the state shown in FIG. 6(d).

Figure 6D:
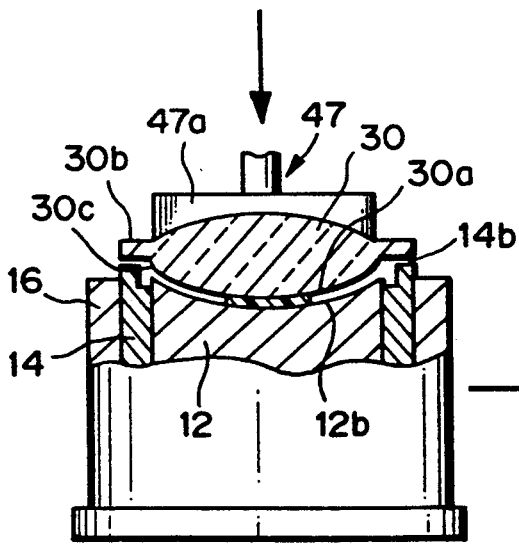

Next, after the state shown in FIG. 6(d) has been attained, the glass member 30 is lowered again, this time at a second low speed, namely V5=0.5 mm/sec. The reason for making the second low speed V5 higher than the first low speed V4 is as follows: Air bubbles become entrapped in the resin material most easily at the instant the glass member 30 impacts against the resin material and are less likely to become entrapped after the instant of impact. For this reason, the speed of the latter half of descent is raised to improve productivity.

Figure 6E:
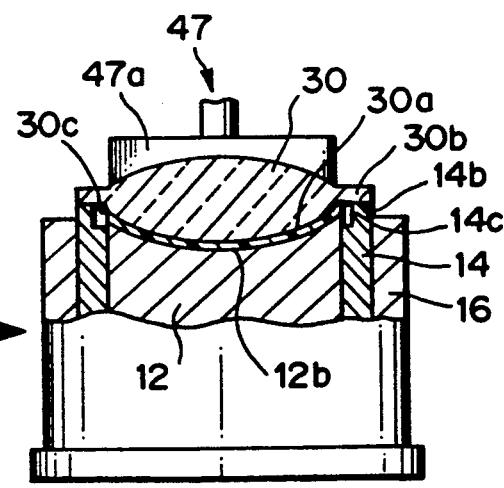

The operation for lowering the glass member 30 continues until the glass member 30 touches the support member 14, as shown in FIG. 6(e). At this moment descent is halted, thereby ending the operation for placing the glass member 30 on the support member 14.

Carrying out the process for placing the glass member 30 on the support member in the manner described above provides a number of outstanding effects. Specifically, the time required for the process can be shortened by speeding up the initial part of the lowering process, which does not include factors that influence the performance of the replica lens. In addition, the entrapment of air bubbles in the resin layer can be positively prevented by greatly reducing the speed of descent of the glass member 30 at the instant the glass member 30 contacts the resin material, namely at the instant air bubbles are most easily entrapped in the resin. By maintaining the glass member 30 in slight contact with the resin material for a prescribed period of time, the area of contact between the resin material and the glass member 30 widens so that it is possible to reduce further the possibility that air bubbles will become entrapped during the process for subsequently lowering the glass member 30. Furthermore, by raising the speed of descent slightly in the latter part of the lowering process, the time required for placing the glass member can be shortened.

In a case where the glass member 30 was actually placed upon the support member 14 under the conditions illustrated in the foregoing example, the probability of air bubbles becoming entrapped in the resin material to a degree verifiable by eye was about 1%. In other words, when the glass member 30 was placed on the support member under the above-described conditions, the rate at which non-defective units were produced was 99%. Thus, it was confirmed that the yield of the replica lenses could be improved.

In the process for suppling the resin material and the process for placing the glass member, in actuality it is not possible to control the amount of resin material so that it will fill the space between the contact surface 30a and the molding surface of the 12b of the mold member up to the corners of the space with absolutely no protrusion of the resin material from the space. Consequently, a small amount of the resin material will always protrude from the edge of the molding surface 12b. If the protruding resin material attaches itself to the rim portion 30b of the glass member 30, the completed replica lens 33 when incorporated in the lens barrel will be mounted in a tilted attitude relative to the optic axis of the lens barrel and the optical performance will decline as a result. Accordingly, the glass member 30 is provided with a relief portion 30c for the resin material at a position between the rim portion 30b and the part of the glass member outwardly of an effective diameter D of light rays (see FIG. 9).

The relief portion 30c is formed by cutting into the glass member 30 to a depth below an extension of the contact surface 30a thereof so as to form a steep, upwardly directed inclined surface. Since the protruding resin material attempts to migrate downward in accordance with the force of gravity, the fact that the relief portion 30d is defined by the upwardly directed, steeply inclined surface prevents the resin material from flowing to the rim portion 30b.

Further, a relief portion 14c is formed on the upper end of the support member 14 so that the protruding the resin material is prevented from attaching itself to the support member 14.

When the operation for placing the glass member 30 upon the support member 14 ends, the transport mechanism 36 is actuated to transport the irradiating apparatus 34 to the optic axis of the glass member 30. The resin layer 32 is irradiated, through the glass member 30, with ultraviolet radiation serving as the aforementioned activating energy. As a result of irradiation, the resin layer 32 begins to harden.

Figure 7:
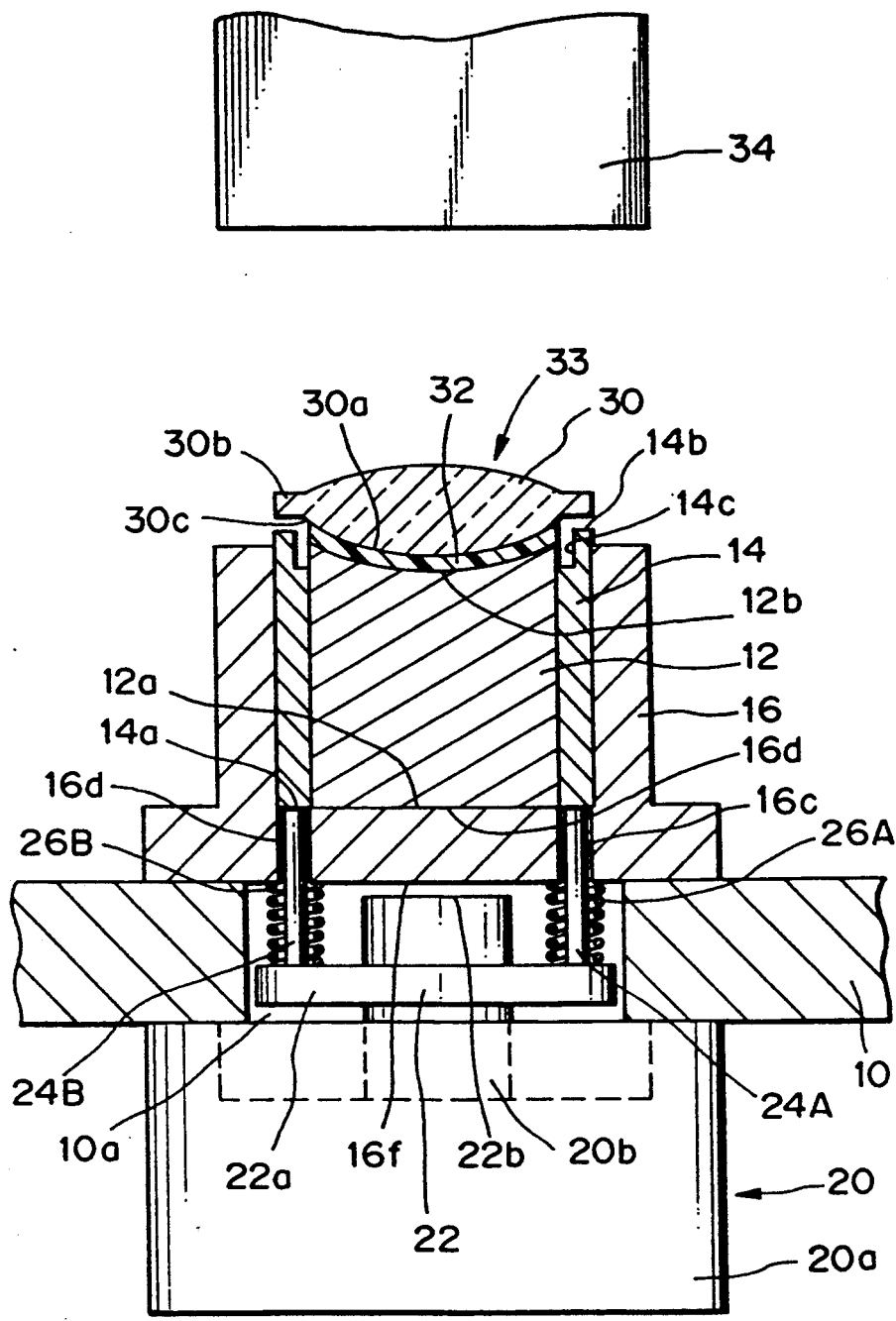
FIG. 7 is a diagram showing the molding apparatus of FIG. 4 in a state where a support member of the apparatus has been released.

In addition to resins of the type which cure by ultraviolet radiation, even resins of the bonding-agent type generally undergo a contraction in volume at curing. Consequently, in a case where the glass member 30 is held by the support member 14 until the resin layer 32 cures completely, peeling develops between the resin layer 32 and the contact surface 30a of the glass member 30 or between the resin layer 32 and the molding surface 12b due to contraction of the resin layer 32. In order to solve this problem in accordance with the embodiment of the invention, the resin layer 32 is allowed to cure to a hardness capable of retaining the glass member 30. Once this state has been attained, the glass member is released from support by the support member 14, as illustrated in FIG. 7. If such an expedient is adopted, the glass member 30 will be capable of moving with the contraction of the resin film 32, thereby making it possible to prevent the peeling phenomenon.

Figure 8:
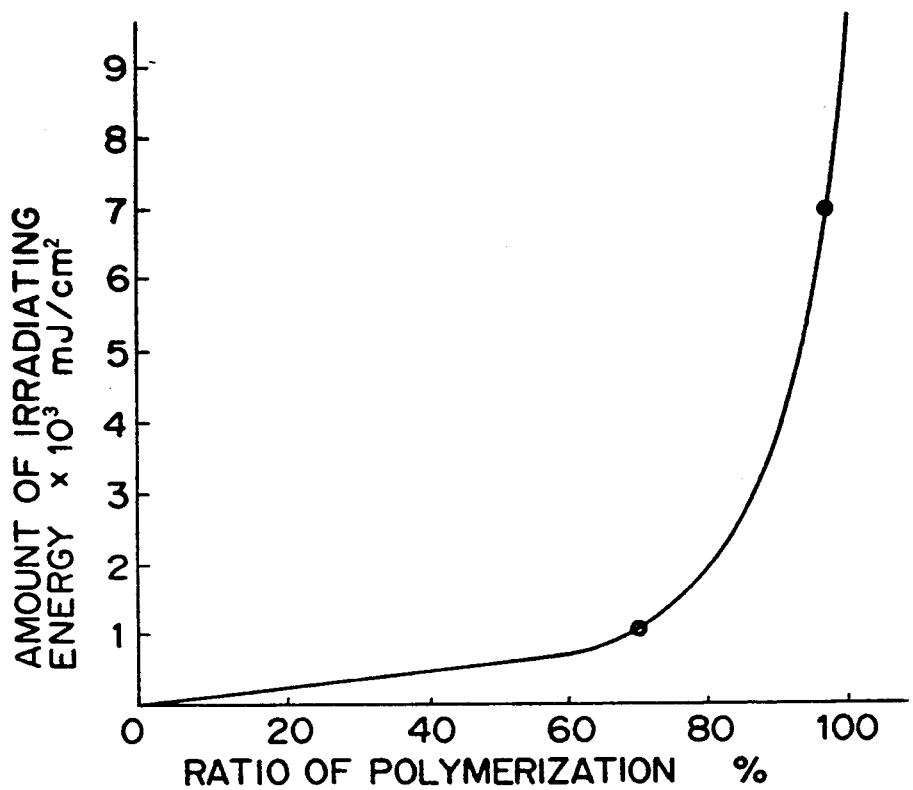
FIG. 8 is a diagram illustrating the relationship between an amount of irradiation energy and degree of polymerization.

This will be described with regard to a specific example. In a case where the above-mentioned resin material of the type cured by ultraviolet radiation, namely the monomer of urethanated acrylate and acrylate, is used as the resin material, the resin layer 32 is irradiated with ultraviolet radiation, which has a center wavelength of 365 nm, for 30 sec at an irradiation intensity of 30 mW/cm$^2$. The resin layer is irradiated using a fluorescent lamp within the irradiating apparatus 34. The amount of irradiating energy per square centimeter by a first stage of irradiation is 30 mW×30 sec=900 mWs=900 mJ. The ratio of polymerization of the resin material is approximately 70%, as indicated by the white circle on the graph of FIG. 8, which illustrates the relationship between irradiating energy and ratio of polymerization. When the ratio of polymerization of approximately 70% has been achieved, the resin layer will have attained a hardness at which the layer will not shift relative to the glass member 30 or molding surface 12b even if the glass member 30 is released from support by the support member 14. Even under these conditions, however, it is possible for the glass member 30 to be moved with respect to the mold member 12 if an external force is applied.

When the first stage of irradiation ends, the air cylinder 20 is deactuated and the glass member 30 is released from support by the support member 14, as depicted in FIG. 7. Thereafter, the resin layer 32 is again irradiated with ultraviolet radiation having the same center wavelength of 365 nm but for a period of 60 sec at an irradiation intensity of 100 mW/cm$^2$. This irradiating operation is performed by a high-voltage mercury-xenon lamp, which is one other light source within the irradiating apparatus 34. The amount of irradiating energy per square centimeter by this second stage of irradiation is 100 mW'60 sec=6000 mJ. The total amount (first and second stages) of irradiating energy is 6900 mJ. The ratio of polymerization corresponding to this amount of irradiating energy is on the order of 96%, as indicated by the black circle on the graph of FIG. 8. This represents substantially complete hardening of the resin material.

In the foregoing example, the irradiation intensity and irradiation time are set in such a manner that the ratio of polymerization of the resin material will be 70% as a result of the first stage of irradiation. However, the set value of polymerization is not limited to 70%. In actual practice, similar effects can be obtained if the ratio of polymerization is set to fall within the range of 50~90%.

Figure 9:
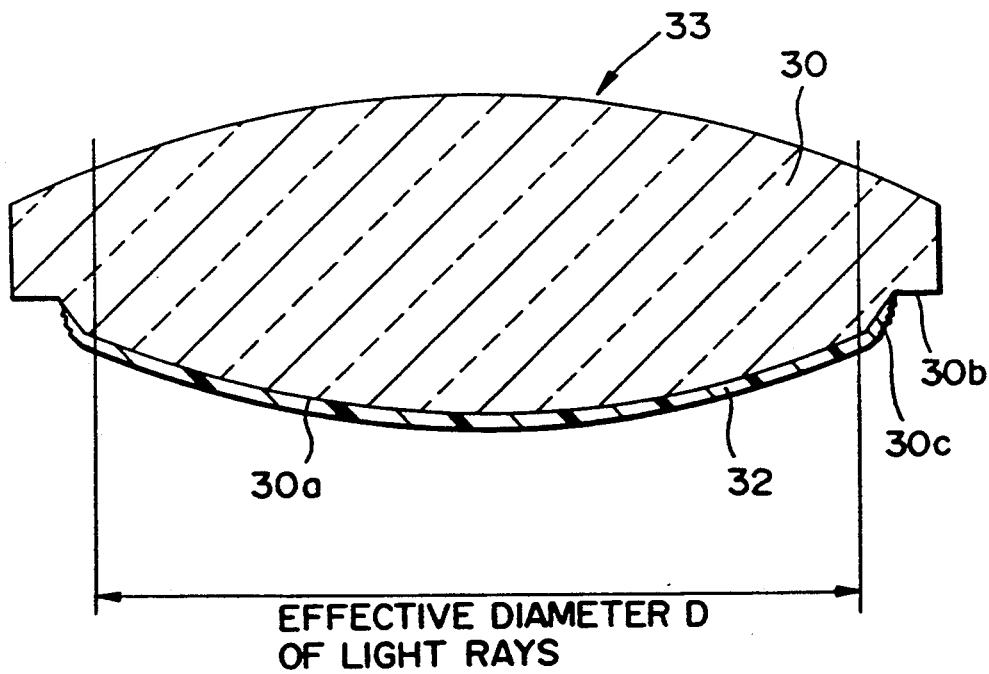
FIG. 9 is a diagram showing the shape of a completed replica lens having a convex surface.

The replica lens 33 whose resin layer 32 has thus been fully cured is released from the mold member 12 and a prescribed coating (e.g., a coating which prevents reflection) is applied to its upper and lower surfaces, thereby completing the replica lens 33. FIG. 9 shows the replica lens 33 in its completed form.

Next, another example of the embodiment will be described below.

The resin material employed here is a liquified compound of urethanated polyesteracrylate of 38 wt %, ditrimethylolpropane-tetraacrylate of 35 wt %, isobornylacrylate of 25 wt % and 1-hydroxycyclohexyl-phenylketone of 2 wt %, which has a faster curing speed than that used in the first example in this embodiment. The molding apparatus and the mold member are the same as those shown in FIG. 4.

First, the resin layer 32 is irradiated with ultraviolet radiation having the center wavelength of 365 nm for a period of 10 second at an irradiation intensity of 2 mW/cm$^2$. The irradiating operation is performed by the fluorescent lamp in the irradiating apparatus 34. The amount of irradiating energy per square centimeter by this first stage of irradiation is 2 mW×10 sec=20 mWs=20 mJ. The ratio of polymerization of the resin material is about 90%, the resin layer will have been hardened to a certain degree by the end of this first irradiation, however, it is possible for the glass member 30 to be moved with respect to the mold member 12 if an external force is applied.

When this first stage of irradiation ends, the air cylinder 20 is deactuated and the glass member 30 is released from support by the support member 14, as shown in FIG. 7. Thereafter, the resin layer 32 is again irradiated with ultraviolet radiation having the same center wavelength of 365 nm for 20 second at an irradiation intensity of 100 mW/cm$^2$. This irradiating operation is performed by the high-voltage mercury-xenon lamp, one other light source within the irradiating apparatus 34. The amount of irradiating energy per square centimeter by this second stage of irradiation is 100 mW×20 sec=2000 mJ. The total amount (first and second stages) of irradiating energy is 2020 mJ. The ratio of polymerization corresponding to this amount of irradiating energy is about 96%, the hardness of the resin layer will have been substantially completed.

According to this example, the irradiation time in the first irradiation stage is 10 sec and that in the second irradiation stage is 20 sec. The total irradiation time 30 sec is short enough to minimize molding time, thus improving productivity.

Further, the resin material has a comparatively low initial viscosity of 500 cps, which prevents mixing of bubbles into the resin material when the resin material contacts the mold member.

Figure 10:
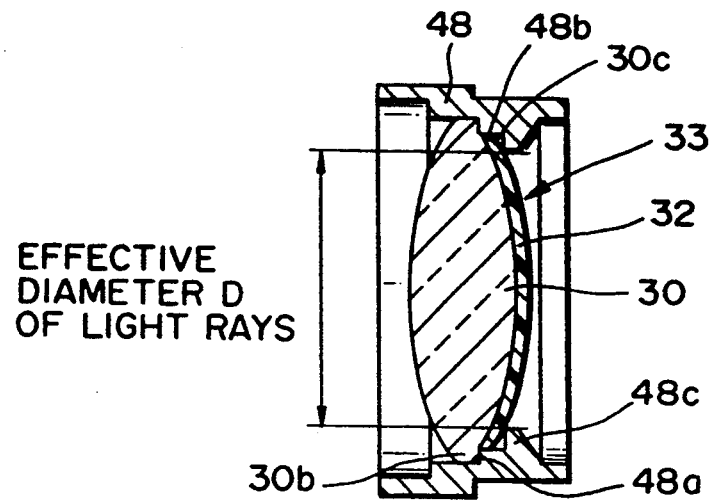
FIG. 10 is a diagram showing an example of a lens barrel in which the replica lens of FIG. 9 has been mounted.

FIG. 10 illustrates a example of a lens barrel in which the replica lens 33 is mounted.

As shown in FIG. 10, a lens barrel 48 is provided with a positioning portion 48a for setting the position of the center of the replica lens 33 as well as its position along the optic axis by abutting against the rim portion 30b of the lens. The lens barrel 48 is further provided with a relief portion 48b for accommodating the resin material protruding from the resin relief portion 30c of the replica lens 33. The lens barrel 48 also includes a light-shielding portion 48c on the light-incident side, namely in front of the replica lens 33. The light-shielding portion 48c has an inner diameter slightly larger than the effective diameter of entrant light rays and therefore prevents the light rays from impinging upon the portion of the resin protruding from the relief portion 30c.

By thus providing the lens barrel 48 with the relief portion 48b for receiving the bulging portion of the resin material and with the light-shielding portion 48c on the light-entrant side, the replica lens 33 can be positioned accurately with respect to the lens barrel 48. Moreover, it is possible to prevent undesirable phenomena such as diffuse reflection and irregular refraction of light rays caused by the light rays impinging upon the bulging portion of the resin material, which has an irregular surface shape. As a result, a deterioration in image quality can be prevented.

In the foregoing embodiment, a case is described in which a replica lens having a convex surface is molded. However, it is possible to apply the method of molding an optical element according to this embodiment in exactly the same manner also in a case where a replica lens having a concave surface is molded.

Figure 11:
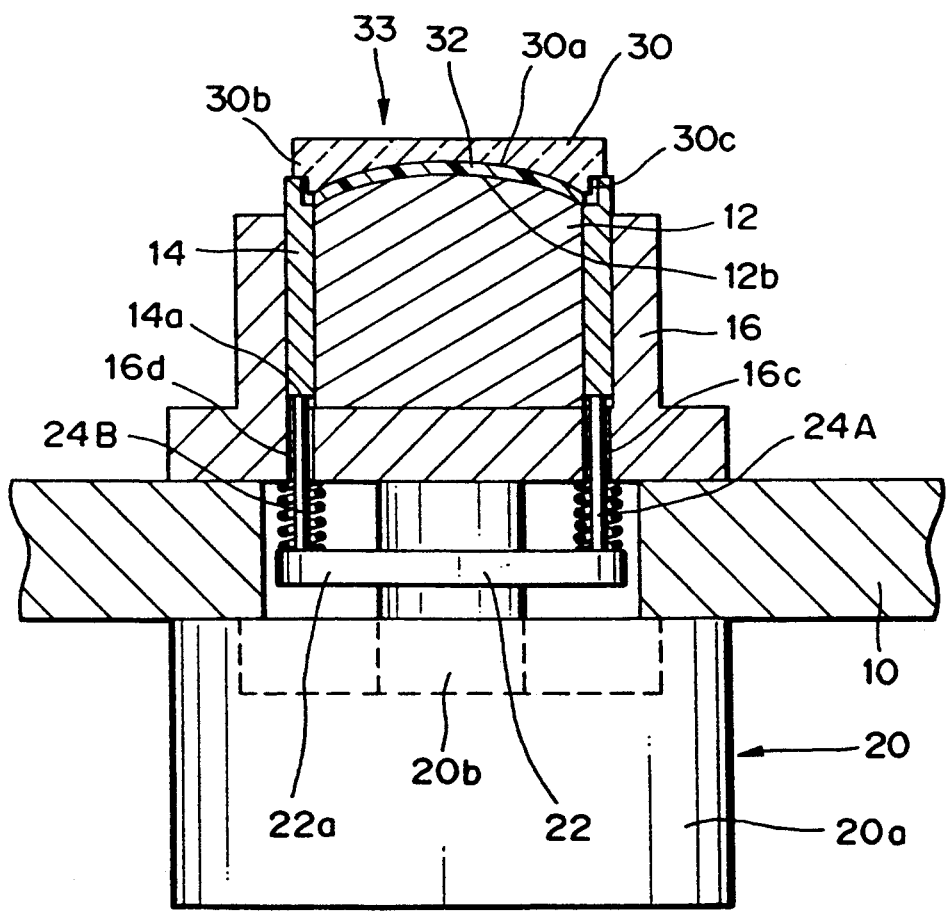
FIG. 11 is a diagram showing the construction of an apparatus for molding a replica lens having a concave surface.

FIG. 11 illustrates a molding apparatus for a case where the replica lens 33 having a concave surface is molded. This apparatus can be realized merely by substituting a mold member corresponding to the concave surface for the mold member 12 in the molding apparatus of FIG. 4. Other structural components and the molding operation are exactly the same as in the molding apparatus shown in FIG. 4.

Figure 12:
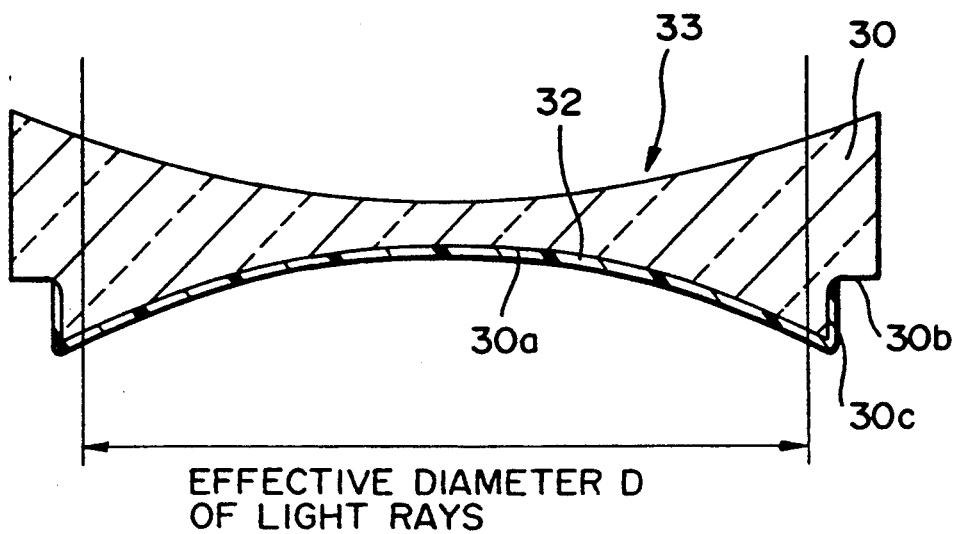
FIG. 12 is a diagram showing the shape of a completed replica lens having a concave surface.

FIG. 12 illustrates the completed shape of the replica lens 33 having a concave surface. As in the replica lens having the convex surface, this lens also has the rim portion 30b and the relief portion 30c for the resin material.

Figure 13:
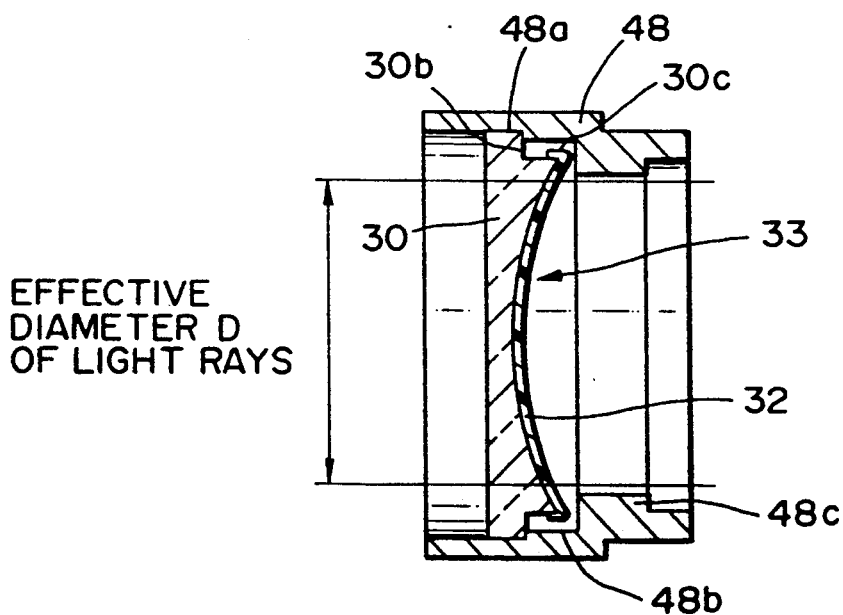
FIG. 13 is a diagram showing an example of a lens barrel in which the replica lens of FIG. 12 has been mounted.

FIG. 13 is a diagram depicting a lens barrel in which the replica lens 33 having the concave surface is mounted. The lens barrel has the positioning portion 48a for positioning the replica lens 33, the relief portion 48b for accommodating the protruding resin material, and the light-shielding portion 48c for preventing light from impinging upon the protruding portion of the resin material. This is exactly the same as in the lens barrel 48 shown in FIG. 10.

Thus, in accordance with the method of molding an optical element according to this embodiment, as described above, a glass member is moved at a high speed from a position at which the surface of the glass member is spaced a predetermined distance away from a molding surface to a position at which the surface of the glass member is about to touch a resin material that has been supplied to the molding surface, then the glass member is moved at a low speed from the position at which the surface of the glass member is about to touch the resin material to a position at which the surface of the glass member touches a support portion. As a result, air bubbles can be prevented from becoming entrapped in the resin material and the yield of the optical element can be improved with certainty.

It should be noted that the present invention can be modified in various ways without departing from the scope of the claims. For example, though a case has been described in which a resin curable by ultraviolet rays is used as the resin curable by activating energy, the resin used can be of the type cured by X rays or infrared rays.

Further, with regard to such conditions as the resin discharge speed and the speed at which the syringe is moved when the resin material is supplied to the mold member, the speed at which the glass member is lowered, and the intensity of irradiation and irradiation time when the resin material is irradiated with ultraviolet radiation, one ideal example is set forth in the illustrated embodiment described above. However, the conditions set forth in the embodiment do not impose a limitation upon the invention.

Though it has been described that the glass member is stopped temporarily once it has contacted the resin material, it is possible to adopt an arrangement in which the glass member is lowered continuously without being stopped or in which the glass member is lowered at a constant low speed, i.e., without changing the speed of the glass member when it is being lowered at the low speed. If the speed at which the glass member is lowered is slowed down sufficiently by the time it contacts the resin material, air bubbles can be prevented from being entrapped in the resin material in this case also.

Though a case in which a replica lens is formed as been described, the present invention can be applied in the same way to other types of optical elements as well providing that the optical element is produced by forming a resin layer on the surface of a glass material.

Furthermore, a case has been described in which an air cylinder and springs are used in order to raise and lower the support member. However, it goes without saying that these can readily be replaced by an elevating mechanism which is a combination of a ball screw and a stepping motor or DC servomotor, etc.

Though it is described that the mold member is held fixed and the support member is moved up and down relative to the mold member, it is permissible to adopt an arrangement in which the support member is fixed and the mold member is moved up and down.

The present invention is not limited to the above embodiments and various changes and modifications can be made within the spirit and scope of the present invention. Therefore, to apprise the public of the scope of the present invention, the following claims are made.

What is claimed is:

1. A resin material supply method in an optical-element molding method for forming an optical element in which a glass material and a resin material are integrated, said molding method including the steps of supplying the resin material, which is a type cured by an activating energy beam, to a molding member having a molding surface, which functions to transfer an optical functional surface onto a surface of the resin material, and forming a resin layer made of the resin material onto the surface of the glass member, said supplying method comprising:
- a first step of making a tip of resin material supply means approach the molding surface, until the tip is a predetermined distance away from the molding surface;
- a second step of discharging a predetermined amount of the resin material from the tip of said supply means while the tip of said supply means is said predetermined distance away from the molding surface; and
- a third step of discharging the resin material from the tip at a predetermined discharge rate, until a total amount of resin which includes said predetermined amount and an amount of resin material discharged in this step attains an amount of resin necessary to be supplied, while the tip of said supply means is moved in a direction away from the molding surface as a lower end of the resin material discharged from said tip is maintained in contact with the molding surface.

2. The method according to claim 1, wherein, in said first step, the tip of said supply means is moved at a high speed in a direction which will cause it to approach the molding surface.

3. The method according to claim 1, wherein, in said second step, said predetermined amount is at least an amount needed for the lower end of the resin material discharged from the tip of said supply means to touch the molding surface.

4. The method according to claim 1, wherein, in said second step, said predetermined amount is managed based upon elapsed time from start of discharge of the resin material by said supply means.

5. The method according to claim 1, wherein said amount of resin necessary to be supplied is managed based upon elapsed time from start of discharge of the resin material by said supply means.

6. The method according to claim 1, wherein said resin material is a resin cured by activating energy.

7. A glass material supply method in an optical-element molding method for forming an optical element in which a glass material and a resin material are integrated, said molding method including the steps of supplying the resin material, which is a type cured by an activating energy beam, to a molding member having a molding surface, which functions to transfer an optical functional surface onto a surface of the resin material, and forming a resin layer made of the resin material onto the surface of the glass member, said glass supplying method comprising:
- a first step of supplying the resin material to the molding surface;
- a second step of moving the glass member at a high speed from a first position at which the lower surface of the glass member is spaced a predetermined distance away from the molding surface to a second position at which the lower surface of the glass member is about to touch the resin material that has been supplied to the molding surface;
- a third step of moving the glass member at a first low speed form said second position to a third position at which the lower surface of the glass member touches an upper end of the resin material; and
- a fourth step of moving the glass member at a second low speed from said third position to a fourth position at which the glass member touches a support portion for supporting the lower surface of the glass member in a state in which the surface of the glass member is spaced away from the molding surface by a distance which determines the thickness of the resin layer.

8. The method according to claim 7, wherein a distance traveled by the glass member in said second step is managed based upon elapsed time from start of movement of the glass member from said first position.

9. The method according to claim 7, wherein a distance traveled by the glass member in said third step is managed based upon elapsed time from start to movement of the glass member from said second position.

10. The method according to claim 7, wherein a distance traveled by the glass member in said fourth step is managed based upon elapsed time from start of movement of the glass member from said third position.

11. The method according to claim 7, wherein said fourth step includes:
- a first subordinate step of holding the glass member at said third position for a predetermined period of time; and
- a second subordinate step of moving the glass member from said third position to said fourth position.

12. The method according to claim 7, wherein said second low speed is set to a speed higher than said first low speed.

13. The method according to claim 7, wherein said resin material is a resin cured by activating energy.

14. A resin material supply method in an optical-element molding method for forming an optical element in which a glass material and a resin material are integrated, said molding method including the steps of supplying the resin material, which is a type cured by an activating energy beam, to a molding member having a molding surface, which functions to transfer an optical functional surface onto a surface of the resin material, and forming a resin layer made of the resin material on the surface of the glass member, said supplying method comprising:
- a first step of positioning a discharge port of a container containing said resin material at a first position approaching the molding surface;
- a second step of commencing to discharge to resin material from said discharge port while said discharge port is positioned at said first position;
- a third step of moving said discharge port in a direction away from the molding surface, after the resin material commences to discharge in said second step, while the discharge of said resin material is being continued; and
- a fourth step of ending the discharge of the resin material, after said discharge port is moved to a second position in a predetermined distance away from said molding surface, and when the amount to be supplied to said molding surface is attained.

* * * * *

UNITED STATES PATENT AND TRADEMARK OFFICE
CERTIFICATE OF CORRECTION

PATENT NO. : 5,264,160
DATED : November 23, 1993
INVENTOR(S) : Takashi ARAI, et al.

It is certified that error appears in the above-indentified patent and that said Letters Patent is hereby corrected as shown below:

Title page, item

[56] References Cited

Under "5,102,599    4/1992    Shults...........264/142"

Insert:

```
--3,423,488   1/1969   Bowser...........264/2.2
  3,428,533   2/1969   Pichel..........264/2.1X
  4,061,518  12/1977   Burroughs, et al..156/232
  4,116,753   9/1978   Tojyo, et al.....156/629
  4,155,962   5/1979   Neefe............264/2.5
  4,159,292   6/1979   Neefe............264/2.3
  4,235,654  11/1980   Dohi, et al......156/99
  4,623,496  11/1986   Verhoeven, et al..264/1.7
  4,738,516   4/1988   Verhoeven, et al..350/432--
```

Under "62-227711    10/1987    Japan.............264/1.7

Insert:

```
--62-272203  11/1987  Japan.............264/1.7
  62-288030  12/1987  Japan.............264/1.7--
```

COLUMN 1:
    line 46, "tip 60" should read --tip 60a--.

COLUMN 3:
    line 2, "embodiment" should read --embodiments--.

COLUMN 7:
    line 30, "4 sec" should read --4 sec.--

UNITED STATES PATENT AND TRADEMARK OFFICE
CERTIFICATE OF CORRECTION

PATENT NO. : 5,264,160
DATED : November 23, 1993
INVENTOR(S) : Takashi ARAI, et al.

It is certified that error appears in the above-indentified patent and that said Letters Patent is hereby corrected as shown below:

COLUMN 11:
line 13, "protruding the" should read --protruding--.

COLUMN 12:
line 9, "100mW'60 sec=6000mJ." should read --100mw x 60sec=6000mJ.--.
line 42, "10 second" should read --10 seconds--.
line 59, "20 second" should read --20 seconds--.

COLUMN 13:
line 2, "10 sec" should read --10 sec.--.
line 4, "sec" should read --sec.--.

COLUMN 14:
line 40, "as" should read --has--.

COLUMN 16:
line 2, "form" should read --from--.

Signed and Sealed this

Nineteenth Day of July, 1994

Attest:

BRUCE LEHMAN

Attesting Officer

Commissioner of Patents and Trademarks